(12) United States Patent
Lee

(10) Patent No.: US 10,296,244 B2
(45) Date of Patent: May 21, 2019

(54) MEMORY SYSTEM AND OPERATING METHOD THEREOF

(71) Applicant: SK hynix Inc., Gyeonggi-do (KR)

(72) Inventor: Jong-Min Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 54 days.

(21) Appl. No.: 15/438,878

(22) Filed: Feb. 22, 2017

(65) Prior Publication Data

US 2018/0018112 A1    Jan. 18, 2018

(30) Foreign Application Priority Data

Jul. 14, 2016    (KR) .................. 10-2016-0089383

(51) Int. Cl.
*G06F 12/02* (2006.01)
*G06F 3/06* (2006.01)

(52) U.S. Cl.
CPC ............ *G06F 3/0619* (2013.01); *G06F 3/061* (2013.01); *G06F 3/064* (2013.01); *G06F 3/065* (2013.01); *G06F 3/0659* (2013.01); *G06F 3/0673* (2013.01); *G06F 3/0679* (2013.01); *G06F 3/0688* (2013.01)

(58) Field of Classification Search
CPC combination set(s) only.
See application file for complete search history.

(56) References Cited

U.S. PATENT DOCUMENTS

| | | | |
|---|---|---|---|
| 7,890,550 B2 | 2/2011 | Jung et al. | |
| 8,626,986 B2 | 1/2014 | Wu et al. | |
| 9,190,155 B2 | 11/2015 | Lee et al. | |
| 9,323,667 B2 | 4/2016 | Bennett | |
| 2014/0237286 A1* | 8/2014 | Jung | G11C 29/76 714/6.13 |

* cited by examiner

*Primary Examiner* — Yong J Choe
(74) *Attorney, Agent, or Firm* — IP & T Group LLP

(57) ABSTRACT

A memory system may include: a memory device including a plurality of memory blocks, each of the memory blocks including a plurality of pages; and a controller suitable for: storing user data corresponding to a write command, in the memory blocks; storing map data corresponding to the stored user data, in the memory blocks; determining entropies indicating amounts of the map data updated in the memory blocks which correspond to the stored user data; and selecting source memory blocks among the memory blocks, which correspond to the entropies.

20 Claims, 10 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2016-0089383 filed on Jul. 14, 2016, the disclosure of which is herein incorporated by reference in its entirety.

TECHNICAL FIELD

Exemplary embodiments relate to a memory system, and more particularly, to a memory system which processes data with respect to a memory device, and an operating method thereof.

DISCUSSION OF THE RELATED ART

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. The memory system may be used as a main memory device or an auxiliary memory device of a portable electronic device.

Since they have no moving parts, memory systems using memory devices provide excellent stability, durability, high information access speed, and low power consumption. Examples of memory systems having such advantages include universal serial bus (USB) memory devices, memory cards having various interfaces, and solid state drives (SSD).

SUMMARY

Various embodiments are directed to a memory system and an operating method thereof, capable of minimizing complexity and performance deterioration of a memory system and maximizing use efficiency of a memory device, thereby quickly and stably processing data with respect to the memory device.

In an embodiment, a memory device including a plurality of memory blocks, each of the memory blocks including a plurality of pages; and a controller suitable for: storing user data corresponding to a write command, in the memory blocks; storing map data corresponding to the stored user data, in the memory blocks; determining entropies indicating amounts of the map data updated in the memory blocks which correspond to the stored user data; and selecting source memory blocks among the memory blocks, which correspond to the entropies.

The controller may update the map data corresponding to the stored user data, and may determine the numbers of map segments of updated map data.

The entropies may be determined in correspondence to the numbers of the map segments of the updated map data.

The controller may select the source memory blocks sequentially from a memory block having a minimal entropy among the memory blocks.

The controller may perform, when a write command for the user data stored in the memory blocks is received from a host, an update program operation for the user data stored in the memory blocks.

The controller may update the map data for the memory blocks, corresponding to the update program operation in the memory blocks.

The controller may determine valid pages in the memory blocks corresponding to the stored user data, and may select the source memory blocks corresponding to the numbers of the valid pages.

The controller may select the source memory blocks sequentially from a memory block having a minimal number of valid pages among the memory blocks.

The controller may record parameters derived from combining the numbers of the valid pages and the entropies, the numbers of the valid pages and the entropies, in a list by the memory blocks, and may store the list in the memory blocks.

The controller may select target memory blocks among the memory blocks, and copies and may store valid data in the source memory blocks, into the target memory blocks.

In an embodiment, a method for operating a memory system may include: storing user data corresponding to a write command, in a plurality of memory blocks in a memory device, each of the memory blocks including a plurality of pages; storing map data corresponding to the stored user data, in the memory blocks; determining entropies indicating amounts of the map data updated in the memory blocks corresponding to the stored user data; and selecting source memory blocks among the memory blocks, corresponding to the entropies.

The method may further include: updating the map data corresponding to the stored user data, the determining of the entropies comprises determining the numbers of map segments of updated map data.

The entropies correspond to the numbers of the map segments of the updated map data.

The selecting may select the source memory blocks sequentially from a memory block having a minimal entropy among the memory blocks.

The method may further include: performing, when a write command for the user data stored in the memory blocks is received from a host, an update program operation for the user data stored in the memory blocks.

The updating of the map data may include updating the map data for the memory blocks, which correspond to the update program operation in the memory blocks.

The determining of the entropies may include determining valid pages in the memory blocks corresponding to the stored user data, and the selecting may select the source memory blocks corresponding to the numbers of the valid pages.

The selecting of the source memory blocks may include selecting the source memory blocks sequentially from a memory block having a minimal number of valid pages among the memory blocks.

The method may further include: recording parameters derived from combining the numbers of the valid pages and the entropies in a list, by the memory blocks; and storing the list in the memory blocks.

The method may further include: selecting target memory blocks among the memory blocks; and copying and storing valid data in the source memory blocks, into the target memory blocks.

BRIEF DESCRIPTION OF THE DRAWINGS

These and other features and advantages of the present invention will become apparent to persons skilled in the art to which this invention pertains from the following detailed description of various embodiments of the present invention in reference to the accompanying drawings, wherein.

DETAILED DESCRIPTION

Figure 1:
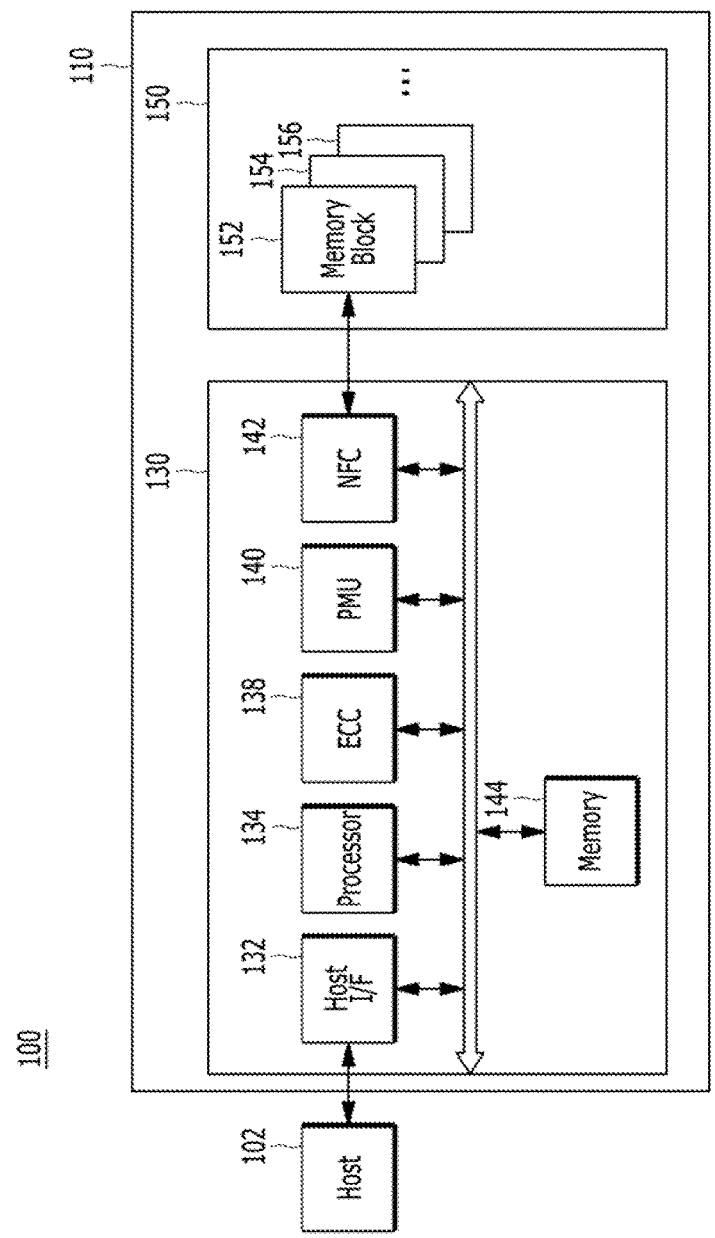
FIG. 1 is a diagram illustrating a data processing system including a memory system coupled to a host, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In the following description, numerous specific details are set forth to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art to which this invention pertains, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system 110, according to an embodiment of the present invention.

Referring to FIG. 1, the data processing system 100 may include a host 102 and the memory system 110 coupled to the host 102.

For example, the host 102 may include a portable electronic device such as a mobile phone, an MP3 player and a laptop computer or a non-portable electronic device such as a desktop computer, a game player, a television (TV) and a projector.

The memory system 110 may operate in response to a request from the host 102. For example, the memory system 110 may store data to be accessed by the host 102. The memory system 110 may be used as a main memory system or an auxiliary memory system of the host 102. The memory system 110 may be implemented with any one of various storage devices, according to the protocol of a host interface coupled electrically with the host 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device configured as a solid state drive (SSD). When the memory system 110 is used as an SSD, the operation speed of the host 102 that is electrically coupled with the memory system 110 may be significantly increased.

The controller 130 and the memory device 150 may be integrated into one semiconductor device configured as a memory card, such as a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

Additionally, the memory system 110 may be configured in any one of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when a power supply to the device is interrupted. In particular, the memory device 150 may store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device such as a flash memory. The flash memory may have a three-dimensional (3D) stack structure.

The controller 130 of the memory system 110 may control the memory device 150 in response to a request from the host 102. The controller 130 may provide the data read from the memory device 150 to the host 102, and store the data provided from the host 102 in the memory device 150. The controller 130 may control overall operations of the memory device 150, such as read, write, program and erase operations.

For example, the controller 130 may include a host interface unit 132, a processor 134, an error correction code (ECC) unit 138, a power management unit (PMU) 140, a NAND flash controller (NFC) 142, and a memory 144 operatively coupled via an internal bus IB.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on any one of coded modulation schemes such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all suitable circuits, systems or devices for the error correction operation.

The PMU 140 may provide and manage power for the controller 130, that is, power for the component elements included in the controller 130. Any suitable PMU may be employed.

The NFC 142 is a memory interface between the controller 130 and the memory device 150 which allows the controller 130 to control the memory device 150 in response to a request from the host 102. For example, the NFC 142 may generate control signals for the memory device 150 and process data under the control of the processor 134 when the memory device 150 is a flash memory. In particular, when the memory device 150 is a NAND flash memory, the NFC 142 may generate control signals for the memory device 150 and process data under the control of the processor 134. When the memory device 150 is not a NAND flash memory, other well-known memory interfaces may be employed that are suitable for serving as a memory interface between the controller 130 and the memory device 150 for allowing the controller 130 to control the memory device 150 in response to a request from the host 102.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150, for read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control the operations of the memory system 110 including a write operation or a read operation for the memory device 150, in response to a write request or a read request from the host 102. The processor 134 may drive firmware such as a flash translation layer (FTL), for controlling the operations of the memory system 110. For example, the processor 134 may be implemented with a microprocessor. For example, the processor may be implemented with a central processing unit (CPU).

Other units may also be employed. For example, a bad block management unit (not shown) may be included in the processor 134 for performing bad block management of the memory device 150. The bad block management unit may find bad memory blocks included in the memory device 150, which are in an unsatisfactory condition for further use, and perform bad block management on the bad memory blocks. For example, when the memory device 150 is a flash memory, such as, a NAND flash memory, a program failure may occur during a write operation also referred to as a program operation, due to characteristics of a NAND logic function. During a bad block management operation, the data of the program-failed memory block or the bad memory block may be programmed into a new memory block. The bad memory block may then be disabled. Hence, bad block management may be employed to reduce deterioration of the utilization efficiency of the memory device 150 having a 3D stack structure and to protect the reliability of the memory system 100. Any suitable bad block management unit and method may be employed.

Figure 2:
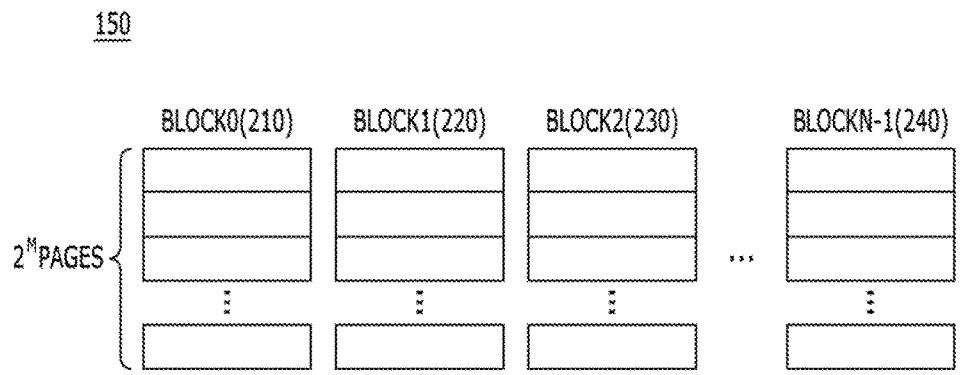
FIG. 2 is a diagram illustrating a memory device in the memory system of FIG. 1, according to an embodiment of the present invention.

FIG. 2 is a diagram illustrating the memory device 150 of FIG. 1, according to an embodiment of the present invention.

Referring to FIG. 2, the memory device 150 may include a plurality of memory blocks. For example, the memory device 150 may include zeroth to (N−1)$^{th}$ memory blocks 210 to 240. Each of the plurality of memory blocks 210 to 240 may include a plurality of pages. For example, each of the plurality of memory blocks 210 to 240 may include $2^M$ number of pages ($2^M$ PAGES), to which the present invention will not be limited. Each of the plurality of pages may include a plurality of memory cells electrically coupled to a word line.

Furthermore, the memory device 150 may include a plurality of memory blocks, as single level cell (SLC) memory blocks and multi-level cell (MLC) memory blocks, according to the number of bits which may be stored in or expressed in each memory cell. An SLC memory block may include a plurality of pages which are implemented with memory cells each capable of storing 1-bit data. An MLC memory block may include a plurality of pages which are implemented with memory cells each capable of storing multi-bit data for example, two or more-bit data. An MLC memory block including a plurality of pages which are implemented with memory cells that are each capable of storing 3-bit data may be also referred to as a triple level cell (TLC) memory block.

Each of the plurality of memory blocks 210 to 240 may store the data provided from the host 102 during a write operation, and may provide stored data to the host 102 during a read operation.

Figure 3:
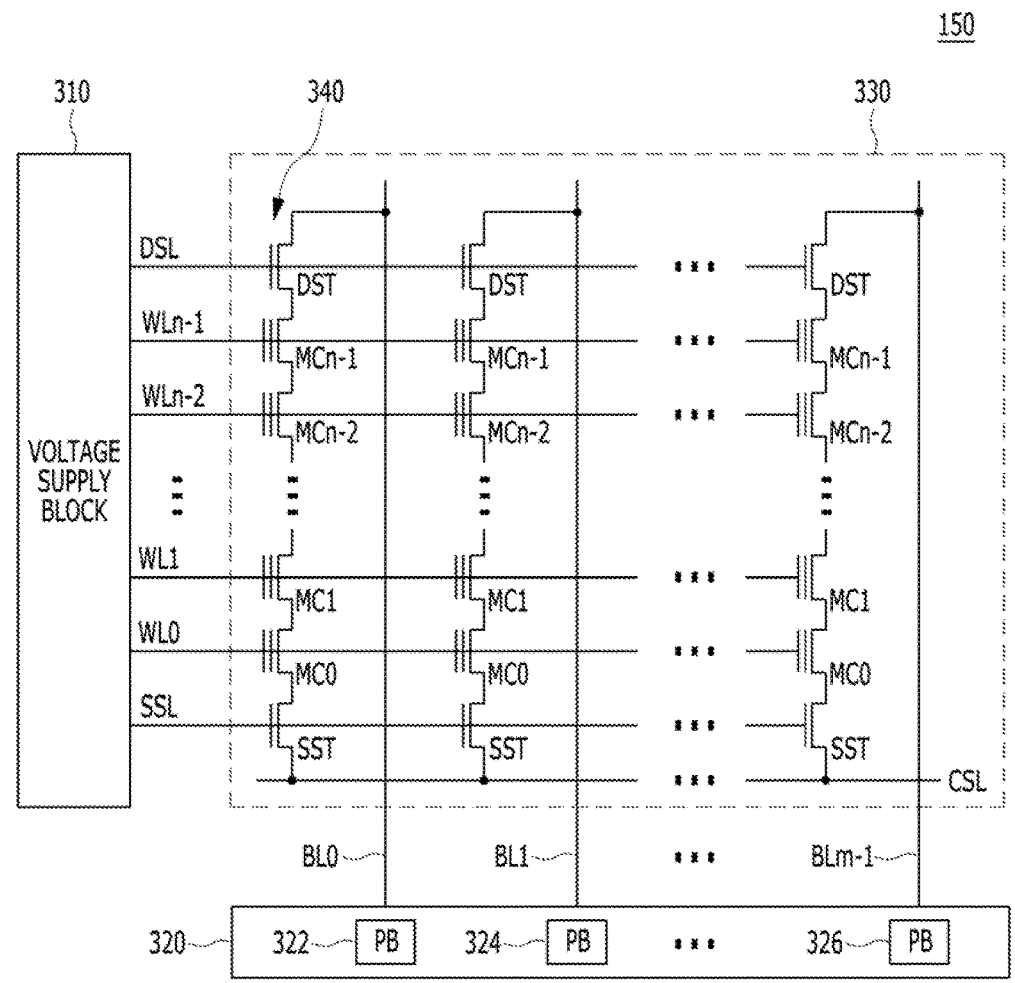
FIG. 3 is a diagram illustrating a memory cell array circuit of a memory block in a memory device, according to an embodiment of the present invention.

FIG. 3 is a circuit diagram illustrating one of the plurality of memory blocks 152 to 156 of the memory device 150 of FIG. 1.

Referring to FIG. 3, the memory block 152 of the memory device 150 may include a plurality of cell strings 340 which are electrically coupled to a plurality of bit lines BL0 to BLm−1, respectively. Each cell string 340 may include at least one drain select transistor DST and at least one source select transistor SST. Each cell string 340 may also include a plurality of memory cells or a plurality of memory cell transistors MC0 to MCn−1 electrically coupled in series between the at least one drain select transistor DST and the at least one source select transistor SST. Each of the memory cells MC0 to MCn−1 may be configured by a multi-level cell (MLC) which stores data information of a plurality of bits. Each of the strings 340 may be electrically coupled to a corresponding bit line among the plurality of bit lines BL0 to BLm−1. For reference, in FIG. 3, 'DSL' denotes a drain select line, 'SSL' denotes a source select line, and 'CSL' denotes a common source line.

While FIG. 3 shows, as an example, the memory block 152 of the memory device 150 which is configured by NAND flash memory cells, it is noted that the memory block 152 is not limited to NAND flash memory cells. For example, according to other embodiments, the memory block 152 may be implemented with NOR flash memory cells and hybrid flash memory cells in which at least two kinds of memory cells are combined. In an embodiment, the memory block 152 may be implemented as a one-NAND flash memory in which a controller is built in a memory chip. In an embodiment, the memory device 152 may be a flash memory device in which a charge storing layer is configured by conductive floating gates. In another embodiment, the memory device 152 may be a charge trap flash (CTF) in which a charge storing layer is configured by a dielectric layer.

A voltage supply block 310 of the memory device 150 may supply word line voltages such as a program voltage, a read voltage and a pass voltage, to respective word lines according to an operation mode and may supply voltages to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during a program operation, and may drive the bit lines according to the received data. The read/write circuit 320 may include a plurality of page buffers 322, 324 and 326 respectively corresponding to columns or bit lines, or pairs of columns or pairs of bit lines, and a plurality of latches (not shown) may be included in each of the page buffers 322, 324 and 326.

Figure 4:
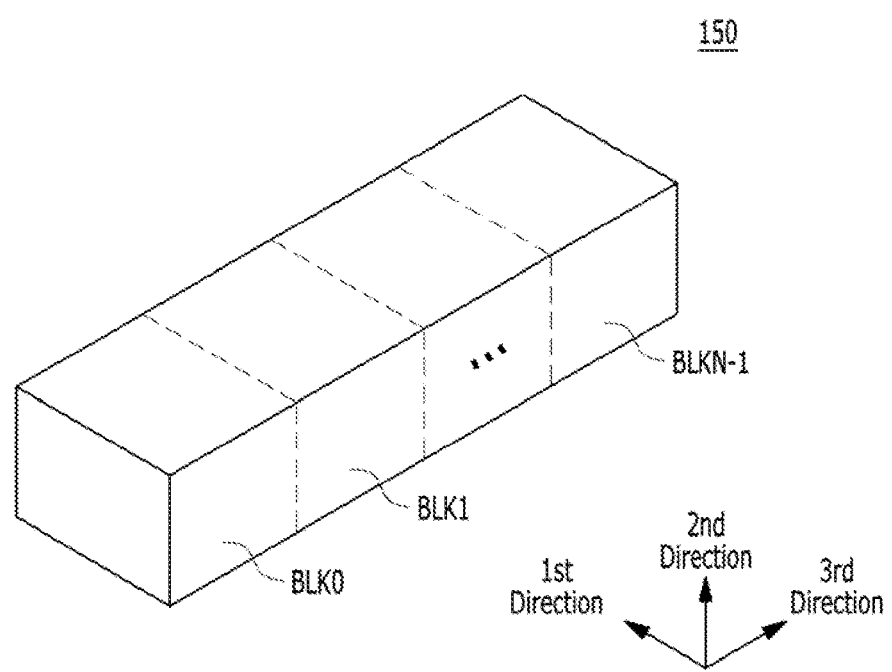
FIG. 4 is a diagram illustrating a structure of the memory device in the memory system, according to an embodiment of the present invention.

FIG. 4 is a block diagram schematically illustrating an example of the memory device 150 of FIG. 1.

Referring to FIG. 4, the memory device 150 may include a plurality of memory blocks BLK0 to BLKN−1, each of the memory blocks BLK0 to BLKN−1 being implemented in a three-dimensional (3D) structure also referred to as a vertical structure. Each of the memory blocks BLK0 to BLKN−1 may include structures which extend in first to third directions. The respective memory blocks BLK0 to BLKN−1 may include a plurality of cell strings, for example, a plurality of NAND strings, each cell string extending in the second direction, for example, in the vertical direction. The plurality of NAND strings may be spaced apart at regular intervals in the first and second directions. Each NAND string may be electrically coupled to a bit line, at least one source select line, at least one ground select line, a plurality of word lines, at least one dummy word line, and a common source line. Namely, the respective memory blocks BLK0 to BLKN−1 may be electrically coupled to a plurality of bit lines, a plurality of source select lines, a plurality of ground select lines, a plurality of word lines, a plurality of dummy word lines, and a plurality of common source lines.

Hereinbelow, detailed descriptions will be made with reference to FIGS. 5 to 7, for data processing with respect to a memory device 150 in a memory system according to an embodiment of the present invention. Particularly, a command data processing operation corresponding to a command received from the host 102 with respect to the memory device 150 will be described.

Figure 5:
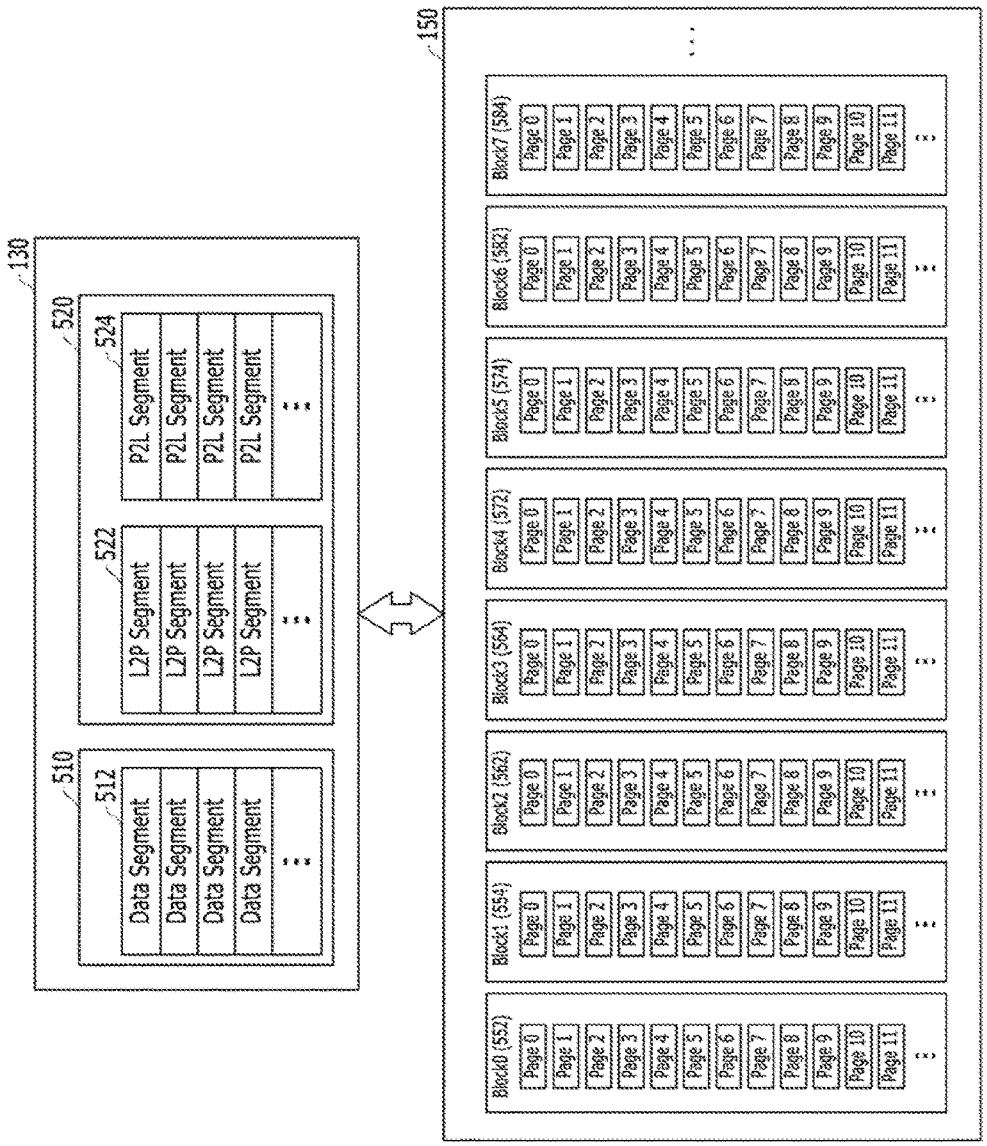
FIGS. 5 to 7 are diagrams illustrating a data processing operation with respect to a memory device in a memory system in accordance with an embodiment.
Figure 6:
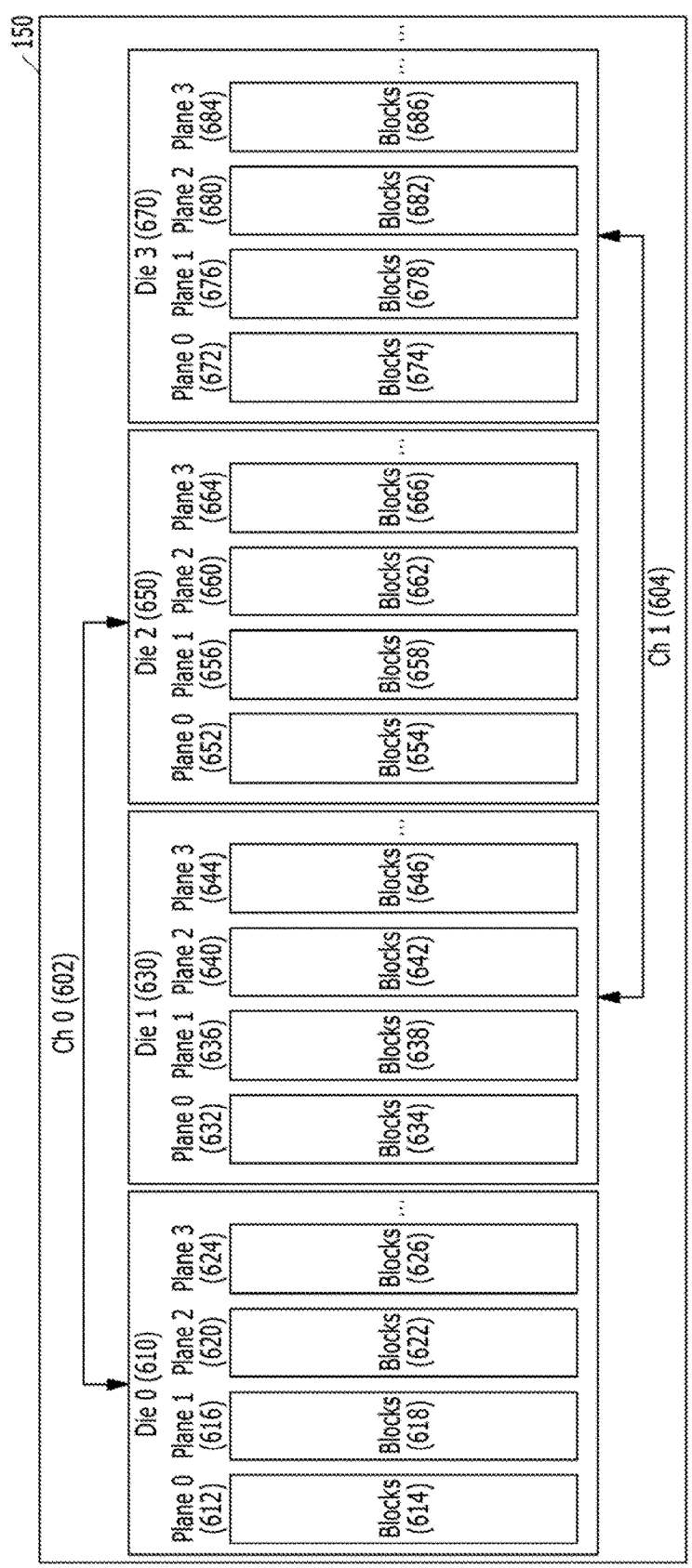
Figure 7:
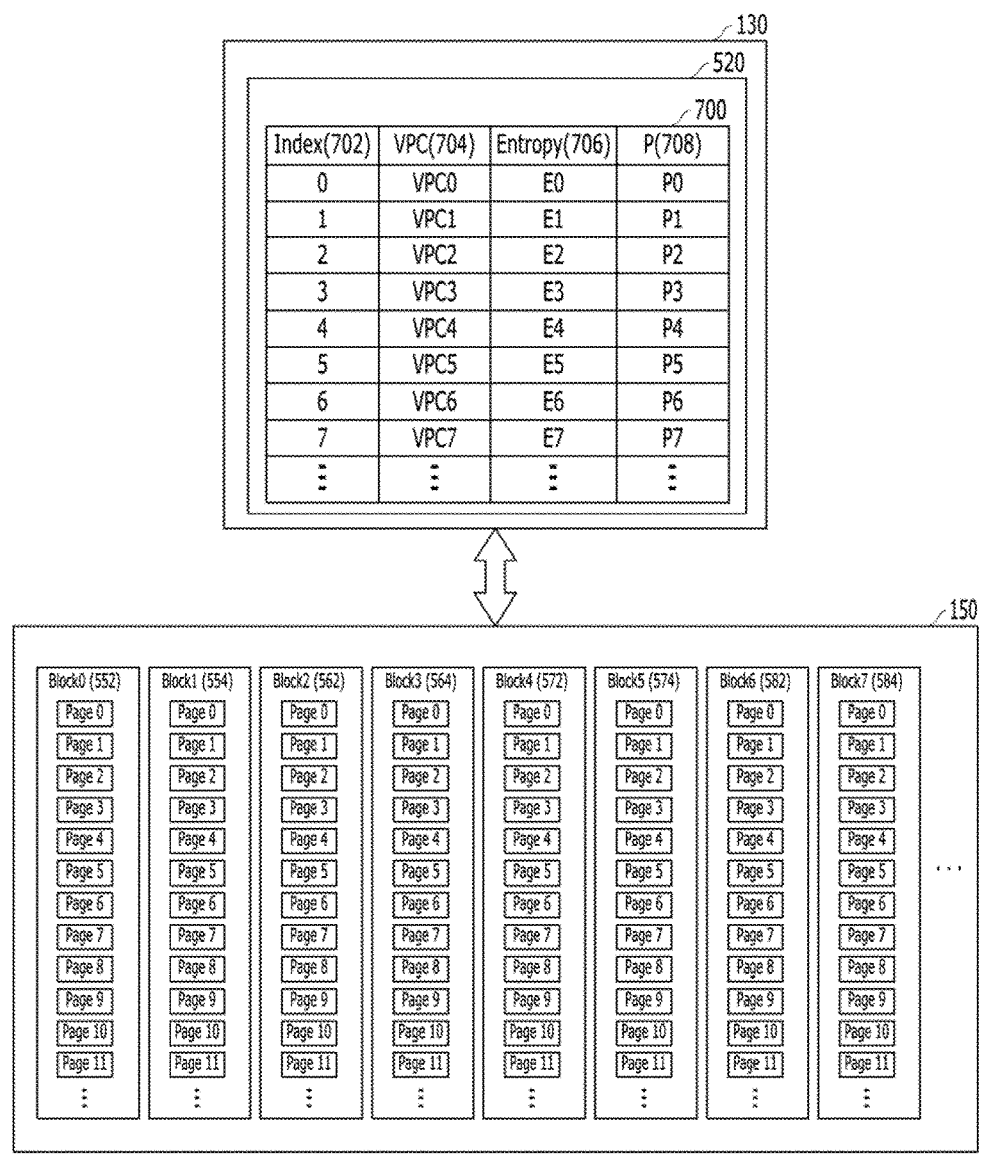

FIGS. 5 to 7 are diagrams illustrating examples of a data processing operation with respect to a memory device in a memory system in accordance with an embodiment. Detailed descriptions will be made, as an example, for data processing when performing a command operation corresponding to a command received from the host 102 in the memory system 110 shown in FIG. 1. For example, detailed descriptions will be made for data processing when performing a program operation corresponding to a write command received from the host 102. Additionally, descriptions will be made, as an example, for data processing when, after storing write data corresponding to the write command received from the host 102 in the buffer/cache included in the memory 144 of the controller 130, the data stored in the buffer/cache are written, that is, programmed and stored, in a plurality of memory blocks included in the memory device 150, and, after updating the data stored in the memory device 150, update data are programmed again in the memory device 150.

Furthermore, when the controller 130 performs a data processing operation in the memory system 110 as described above, the processor 134 included in the controller 130 may perform data processing through a flash translation layer (FTL).

For example, after storing user data and metadata corresponding to the write command received from the host 102 in the buffer included in the memory 144 of the controller 130, the controller 130 writes and stores the data stored in the buffer, in the plurality of memory blocks included in the memory device 150. That is, the controller 130 performs a program operation.

The metadata may include first map data including a logical/physical (L2P: logical to physical) information hereinafter, referred to as a 'logical information', and second map data including a physical/logical (P2L: physical to logical) information hereinafter, referred to as a 'physical information', for the data stored in the memory blocks which corresponds to the program operation. Additionally, the metadata may include information regarding the command data corresponding to the command received from the host 102, information regarding the command operation corresponding to the command, information regarding the memory blocks of the memory device 150 for which the command operation is performed, and information regarding map data corresponding to the command operation. That is, the metadata may include all remaining information and data excluding the user data corresponding to the command received from the host 102.

When the controller 130 receives the command such as the write command, from the host 102, the user data corresponding to the write command are written and stored in the memory blocks of the memory device 150. For example, the user data corresponding to the write command is written and stored in empty memory blocks, open memory blocks or free memory blocks for which an erase operation is performed, among the memory blocks. The metadata may include a mapping information between logical addresses and physical addresses for the user data stored in the memory blocks, and an mapping information between physical addresses and logical addresses for the memory blocks in which the user data are stored. That is, the metadata includes first map data including an L2P map table in which logical information is recorded, and second map data including a P2L map table in which physical information is recorded. The metadata may be written and stored in the empty memory blocks, the open memory blocks or the free memory blocks among the memory blocks of the memory device 150. In particular, in the embodiment of the present disclosure, when the write command is received from the host 102, data segments of the user data corresponding to the write command and meta segments of the metadata are stored in the memory blocks of the memory device 150. That is, L2P segments of the first map data and P2L segments of the second map data as map segments of map data, are stored in the memory blocks of the memory device 150.

When performing a command operation in memory blocks for user data corresponding to a command received from the host 102, by checking first map data and second map data for the user data stored in the memory blocks, the command operation in the memory blocks for the user data is performed, and, in correspondence to such a command operation, the first map data and the second map data for the user data are updated.

In the present embodiment, after the controller 130 stores the user data corresponding to the write command received from the host 102 in the buffer included in the memory 144 of the controller 130, the controller 130 programs the data stored in the buffer, into the plurality of pages of an optional memory block among the plurality of memory blocks included in the memory device 150. For example, the controller 130 performs a program operation and stores the data stored in the buffer, in the first page of a first memory block. When the controller 130 receives a write command from the host 102 for the data stored in the first page of the first memory block, the controller 130 performs an update program operation for the data stored in the first page of the first memory block. That is, the controller 130 stores user data corresponding to the write command received from the host 102, in other pages of the optional memory block, or the pages of another optional memory block. For example, the controller 130 stores the user data corresponding to the write command in the second page of the first memory block, or the first page of a second memory block. The data stored in the page of the previous optional memory block is processed as invalid data. That is, the first page of the first memory block is processed as invalid data, and accordingly, the first page of the first memory block becomes an invalid page.

For an example, when invalid pages are included in the memory blocks of the memory device 150, to maximize the utilization efficiency of the memory device 150, an operation of processing data among the memory blocks of the memory device 150 is performed. Furthermore, descriptions will be made for data processing when performing a background operation for the memory device 150. In the embodiment of the present disclosure, a garbage collection operation may be performed as the background operation which includes an operation of copying and processing data stored in the memory blocks of the memory device 150 to an optional memory block. Furthermore, a wear leveling operation may be performed as the background operation which includes an operation of swapping and processing the memory blocks of the memory device 150 or data stored in the memory blocks. Hereinbelow, detailed descriptions will be made for data processing when performing the operation of copying and processing data in the memory blocks of the memory device 150, that is, a garbage collection operation.

In the present embodiment, when programming is completed for memory blocks among the memory blocks of the memory device 150, the controller 130 performs an operation of copying and storing data among memory blocks. That is, memory blocks in which operations for programming data in all the pages included in each memory block have been performed, among the memory blocks of the memory device 150, the controller 130 performs an operation of copying and storing data among memory blocks. When invalid pages are in closed memory blocks of the memory device 150, the controller 130 performs an operation of copying and storing the data of the valid pages included in memory blocks, that is, valid data, into memory blocks for which programming is not performed. For example, the controller 130 performs an operation of copying and storing the valid data into empty memory blocks, open memory blocks or free memory blocks. That is, the controller 130 performs a garbage collection operation for the memory blocks of the memory device 150.

In the embodiment of the present disclosure, after checking valid pages in the memory blocks of the memory device 150, the controller 130 performs garbage collection in consideration of parameters of the memory blocks. For example, the parameters may include valid page counts (VPCs) of the memory blocks and entropies of the memory blocks. That is, after selecting source memory blocks among the memory blocks in consideration of VPCs and entropies of the memory blocks, valid data in the source memory blocks are copied and stored into target memory blocks. For example, the target memory blocks may include empty memory blocks, open memory blocks or free memory blocks in which programming of data for all the pages included in each memory block is not performed. Then, an erase operation is performed for the source memory blocks. Accordingly, the garbage collection operation of generating the source memory blocks into empty memory blocks, open memory blocks or free memory blocks is performed. As described above, when performing a command operation corresponding to a command received from the host 102, an operation of updating map data of user data corresponding to the program operation is performed. In particular, when performing a program operation corresponding to a write command, the operation of updating map data of user data corresponding to the program operation is performed. At this time, entropies in the memory blocks of the memory device 150 are determined depending on map update amounts in the respective memory blocks. Hereinbelow, a data processing operation in the memory system in accordance with the embodiment will be described in detail with reference to FIGS. 5 to 7.

First, referring to FIG. 5, the controller 130 performs a command operation corresponding to a command received from the host 102, for example, a program operation corresponding to a write command. At this time, the controller 130 writes and stores user data corresponding to the write command, in memory blocks 552, 554, 562, 564, 572, 574, 582 and 584 of the memory device 150. Also, in correspondence to the program operation to the memory blocks 552, 554, 562, 564, 572, 574, 582 and 584, the controller 130 generates and updates metadata for the user data, and writes and stores the metadata in the memory blocks 552, 554, 562, 564, 572, 574, 582 and 584 of the memory device 150.

The controller 130 generates and updates information indicating that the user data are stored in the pages included in the memory blocks 552, 554, 562, 564, 572, 574, 582 and 584 of the memory device 150. For example, the information includes first map data and second map data. That is, the controller 130 generates and updates the logical segments, that is, L2P segments, of the first map data and the physical segments, that is, P2L segments, of the second map data. Then, the controller 130 stores the L2P segments and the P2L segments in the pages included the memory blocks 552, 554, 562, 564, 572, 574, 582 and 584 of the memory device 150, by performing a map flush operation.

For example, the controller 130 caches and buffers the user data corresponding to the write command received from the host 102, in a first buffer 510 included in the memory 144 of the controller 130. That is, the controller 130 stores data segments 512 of the user data in the first buffer 510 as a data buffer/cache. Then, the controller 130 writes and stores the data segments 512 stored in the first buffer 510, in the pages included in the memory blocks 552, 554, 562, 564, 572, 574, 582 and 584 of the memory device 150.

As the data segments 512 of the user data corresponding to the write command received from the host 102 are written and stored in the pages included in the memory blocks 552, 554, 562, 564, 572, 574, 582 and 584 of the memory device 150, the controller 130 generates the first map data and the second map data, and stores the first map data and the second map data in a second buffer 520 included in the memory 144 of the controller 130. Namely, the controller 130 stores L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 writes and stores the L2P segments 522 of the first map data and the P2L segments 524 of the second map data which are stored in the second buffer 520, in the pages included in the memory blocks 552, 554, 562, 564, 572, 574, 582 and 584 of the memory device 150.

Additionally, the controller 130 loads the map segments of data corresponding to a command received from the host 102 in the second buffer 520. For example, the controller 130 loads L2P segments 522 of the first map data and P2L segments 524 of the second map data for user data corresponding to a read command in the second buffer 520, and checks the L2P segments 522 and the P2L segments 524. Subsequently, the controller 130 reads the user data stored in the pages included in corresponding memory blocks among the memory blocks 552, 554, 562, 564, 572, 574, 582 and 584 of the memory device 150, stores data segments 512 of the read user data in the first buffer 510, and provides the data segments 512 to the host 102.

When performing an erase operation or a background operation such as an operation of copying data or swapping data among the memory blocks included in the memory device 150, such as, a garbage collection operation or a wear leveling operation, the controller 130 stores data segments 512 of corresponding user data, in the first buffer 510, and stores map segments 522 and 524 of map data corresponding to the user data, in the second buffer 520, thereby performing the erase operation, the garbage collection operation or the wear leveling operation.

Referring to FIG. 6, the memory device 150 includes a plurality of memory dies including a memory die 0 610, a memory die 1 630, a memory die 2 650 and a memory die 3 670. Each of the memory dies 610, 630, 650 and 670 includes a plurality of planes. For example, the memory die 0 610 includes a plane 0 612, a plane 1 616, a plane 2 620 and a plane 3 624. The memory die 1 630 includes a plane 0 632, a plane 1 636, a plane 2 640 and a plane 3 644. The memory die 2 650 includes a plane 0 652, a plane 1 656, a plane 2 660 and a plane 3 664. The memory die 3 670 includes a plane 0 672, a plane 1 676, a plane 2 680 and a plane 3 684. The respective planes 612, 616, 620, 624, 632, 636, 640, 644, 652, 656, 660, 664, 672, 676, 680 and 684 in the memory dies 610, 630, 650 and 670 included in the memory device 150 include a plurality of memory blocks 614, 618, 622, 626, 634, 638, 642, 646, 654, 658, 662, 666, 674, 678, 682 and 686, respectively. For example, each plane includes N number of blocks Block0, Block1, . . . , BlockN−1, each including a plurality of pages, for example, 2^M number of pages, as described above with reference to FIG. 2. The plurality of memory dies of the memory device 150 are coupled to the same channels. For example, the memory die 0 610 and the memory die 2 650 are coupled through a channel 0 602, and the memory die 1 630 and the memory die 3 670 are coupled through a channel 1 604.

The plurality of memory blocks 552, 554, 562, 564, 572, 574, 582 and 584 included in the memory device 150 include a plurality of pages as described above. The controller 130 in the memory system in accordance with the embodiment of the present disclosure performs a program operation corresponding to a write command received from the host 102. That is, the controller 130 writes and stores user data corresponding to the write command, in the pages included in the memory blocks 552, 554, 562, 564, 572, 574, 582 and 584 of the memory device 150. Furthermore, when a write command for the data stored in the memory blocks 552, 554, 562, 564, 572, 574, 582 and 584 of the memory device 150 is received from the host 102, the controller 130 again performs a program operation, that is, an update program operation. Accordingly, the controller 130 writes and stores user data corresponding to the write command received from the host 102 in other pages of the same memory blocks or pages of other memory blocks of the memory device 150. That is, the controller 130 writes and stores the data stored in the memory blocks 552, 554, 562, 564, 572, 574, 582 and 584 of the memory device 150, in other pages of the same memory blocks or pages of other memory blocks of the memory device 150.

In correspondence to such an update program operation, the controller 130 checks valid pages of the memory blocks 552, 554, 562, 564, 572, 574, 582 and 584 of the memory device 150, and records VPCs indicating the numbers of valid pages in the memory blocks 552, 554, 562, 564, 572, 574, 582 and 584, in a list. In particular, the controller 130 records the VPCs of the respective memory blocks 552, 554, 562, 564, 572, 574, 582 and 584 in the list by indexes indicating the memory blocks 552, 554, 562, 564, 572, 574, 582 and 584 of the memory device 150, and stores the list in the memory 144 of the controller 130. Then, in consideration of the VPCs by the memory blocks 552, 554, 562, 564, 572, 574, 582 and 584, recorded in the list, the controller 130 performs a background operation, for example, a garbage collection operation, for the memory blocks 552, 554, 562, 564, 572, 574, 582 and 584 of the memory device 150.

Further, corresponding with the above-described update program operation, the controller 130 checks map update amounts for the memory blocks 552, 554, 562, 564, 572, 574, 582 and 584 of the memory device 150, and records entropies corresponding to map update amounts in the memory blocks 552, 554, 562, 564, 572, 574, 582 and 584, in the list. In particular, the controller 130 records the entropies of the respective memory blocks 552, 554, 562, 564, 572, 574, 582 and 584 in the list by the indexes indicating the memory blocks 552, 554, 562, 564, 572, 574, 582 and 584 of the memory device 150, and stores the list in the memory 144 of the controller 130. Then, in consideration of the entropies by the memory blocks 552, 554, 562, 564, 572, 574, 582 and 584, recorded in the list, the controller 130 performs a background operation, for example, a garbage collection operation, for the memory blocks 552, 554, 562, 564, 572, 574, 582 and 584 of the memory device 150. For example, when performing a program operation, in particular, an update program operation which corresponds to a write command received from the host 102, in the memory blocks 552, 554, 562, 564, 572, 574, 582 and 584 of the memory device 150, the controller 130 updates map data for the memory blocks 552, 554, 562, 564, 572, 574, 582 and 584 of the memory device 150. Then, the controller 130 checks amounts of map data updated in the respective memory blocks 552, 554, 562, 564, 572, 574, 582 and 584. For example, the controller 130 checks the numbers of map segments of the map data updated in the respective memory blocks 552, 554, 562, 564, 572, 574, 582 and 584. Subsequently, the controller 130 records entropies corresponding to the numbers of map segments of the updated map data in the list, by the respective memory blocks 552, 554, 562, 564, 572, 574, 582 and 584. The entropies of the respective memory blocks 552, 554, 562, 564, 572, 574, 582 and 584 may be recorded in optional bits of a field that records erase counts in the respective memory blocks 552, 554, 562, 564, 572, 574, 582 and 584, and may then be stored in an optional memory block of the memory device 150. For example, erase counts may be stored in 13 bits, and entropies may be stored in 3 bits.

In consideration of VPCs and entropies in the memory blocks 552, 554, 562, 564, 572, 574, 582 and 584 of the memory device 150, the controller 130 performs a data copy operation in the memory blocks 552, 554, 562, 564, 572, 574, 582 and 584 of the memory device 150, for example, a garbage collection operation. At this time, the controller 130 selects source memory blocks in the memory blocks 552, 554, 562, 564, 572, 574, 582 and 584, in consideration of the VPCs and entropies recorded in the list. Then, the controller 130 copies valid data of the source memory blocks to target memory blocks, performs an erase operation for the source memory blocks, and generates thereby the source memory blocks as empty memory blocks, open memory blocks or free memory blocks. Hereinbelow, performing of a garbage collection operation for the memory blocks of the memory device 150 in the memory system in accordance with the embodiment will be described in detail with reference to FIG. 7.

Referring to FIG. 7, as described above, the controller 130 performs a command operation corresponding to a command received from the host 102, for example, a program operation corresponding to a write command. At this time, the controller 130 stores user data corresponding to the write command, in a buffer included in the memory 144 of the controller 130, and writes and stores the user data stored in the buffer, in the plurality of memory blocks 552, 554, 562, 564, 572, 574, 582 and 584 included in the memory device 150. Also, corresponding with the program operation to the memory blocks 552, 554, 562, 564, 572, 574, 582 and 584, the controller 130 generates and updates map data for the user data and writes and stores the map data in the memory blocks 552, 554, 562, 564, 572, 574, 582 and 584 of the memory device 150.

As described above, the plurality of memory blocks 552, 554, 562, 564, 572, 574, 582 and 584 included in the memory device 150 include a plurality of pages. In the embodiment of the present disclosure, when performing an update program of the data stored in the memory blocks 552, 554, 562, 564, 572, 574, 582 and 584 of the memory device 150, the controller 130 checks the numbers of valid pages and amounts of updated map data. For example, the controller 130 checks the numbers of map segments of the updated map data in the memory blocks 552, 554, 562, 564, 572, 574, 582 and 584. Then, the controller 130 records VPCs indicating the numbers of the valid pages in the memory blocks 552, 554, 562, 564, 572, 574, 582 and 584 and entropies indicating the amounts of the updated map data in the memory blocks 552, 554, 562, 564, 572, 574, 582 and 584, in a list. In particular, the controller 130 records, in the list, the VPCs and entropies of the memory blocks 552, 554, 562, 564, 572, 574, 582 and 584 by indexes indicating the memory blocks 552, 554, 562, 564, 572, 574, 582 and 584 of the memory device 150, and stores the list in the memory 144 of the controller 130. The controller 130 performs the garbage collection in consideration of the VPCs and entropies by the memory blocks 552, 554, 562, 564, 572, 574, 582 and 584, recorded in the list. That is, the controller 130 selects source memory blocks among the memory blocks 552, 554, 562, 564, 572, 574, 582 and 584 in consideration of the VPCs and entropies by the memory blocks 552, 554, 562, 564, 572, 574, 582 and 584, recorded in the list. Then, the controller 130 copies the valid data of the source memory blocks to target memory blocks, performs an erase operation for the source memory blocks, and thereby generates the source memory blocks as empty memory blocks, open memory blocks or free memory blocks. Hereinbelow, detailed descriptions will be made for a data processing operation in the embodiment of the present disclosure, by using an example in which the memory block 0 552, the memory block 1 554, the memory block 2 562, the memory block 3 564, the memory block 4 572, the memory block 5 574, the memory block 6 582 and the memory block 7 584 of the memory device 150 are closed memory blocks.

In detail, the controller 130 checks valid pages in the closed memory blocks among the plurality of memory blocks included in the memory device 150. For example, the controller 130 checks valid pages in the memory block 0 552, the memory block 1 554, the memory block 2 562, the memory block 3 564, the memory block 4 572, the memory block 5 574, the memory block 6 582 and the memory block 7 584. Then, the controller 130 generates a list 700 in which VPCs 704 of the memory block 0 552, the memory block 1 554, the memory block 2 562, the memory block 3 564, the memory block 4 572, the memory block 5 574, the memory block 6 582 and the memory block 7 584 are recorded by indexes 702 indicating the memory block 0 552, the memory block 1 554, the memory block 2 562, the memory block 3 564, the memory block 4 572, the memory block 5 574, the memory block 6 582 and the memory block 7 584. After that, the controller 130 stores the list 700 in the second buffer 520 included in the memory 144 of the controller 130. The list 700 in which the VPCs 704 are recorded by the respective memory blocks 552, 554, 562, 564, 572, 574, 582 and 584 may be stored in optional memory blocks of the memory device 150 by being included in metadata.

For example, in the list 700, VPC0 as the VPC 704 of the memory block 0 552 is recorded as corresponding to '0' as the index 702 of the memory block 0 552. VPC1 as the VPC 704 of the memory block 1 554 is recorded as corresponding to '1' as the index 702 of the memory block 1 554. VPC2 as the VPC 704 of the memory block 2 562 is recorded as corresponding to '2' as the index 702 of the memory block 2 562. VPC3 as the VPC 704 of the memory block 3 564 is recorded as corresponding to '3' as the index 702 of the memory block 3 564. VPC4 as the VPC 704 of the memory block 4 572 is recorded as corresponding to '4' as the index 702 of the memory block 4 572. VPC5 as the VPC 704 of the memory block 5 574 is recorded as corresponding to '5' as the index 702 of the memory block 5 574. VPC6 as the VPC 704 of the memory block 6 582 is recorded as corresponding to '6' as the index 702 of the memory block 6 582. VPC7 as the VPC 704 of the memory block 7 584 is recorded as corresponding to '7' as the index 702 of the memory block 7 584.

Furthermore, the controller 130 checks map update amounts of the respective memory blocks 552, 554, 562, 564, 572, 574, 582 and 584, corresponding to the update program operation, in the closed memory blocks among the plurality of memory blocks included in the memory device 150. For example, the controller 130 checks map update amounts of the respective memory blocks 552, 554, 562, 564, 572, 574, 582 and 584, corresponding to the update program operation, in the memory block 0 552, the memory block 1 554, the memory block 2 562, the memory block 3 564, the memory block 4 572, the memory block 5 574, the memory block 6 582 and the memory block 7 584. Namely, as described above, when receiving a write command for the data stored in the respective memory blocks 552, 554, 562, 564, 572, 574, 582 and 584, from the host 102, the controller 130 writes and stores user data corresponding to the write command, in the memory blocks 552, 554, 562, 564, 572, 574, 582 and 584 of the memory device 150. That is, the controller 130 performs an update program operation. In correspondence to such an update program operation, the controller 130 updates map data for the respective memory blocks 552, 554, 562, 564, 572, 574, 582 and 584.

At this time, the controller 130 checks amounts of map data updated by the respective memory blocks 552, 554, 562, 564, 572, 574, 582 and 584. That is, the controller 130 checks the numbers of the map segments of updated map data. Then, the controller 130 records entropies 706 by the respective memory blocks 552, 554, 562, 564, 572, 574, 582 and 584, indicating the numbers of the updated map segments in the list 700, by the indexes 702 indicating the memory block 0 552, the memory block 1 554, the memory block 2 562, the memory block 3 564, the memory block 4 572, the memory block 5 574, the memory block 6 582 and the memory block 7 584. After generating the list 700 in which the entropies 706 are recorded by the respective memory blocks 552, 554, 562, 564, 572, 574, 582 and 584, the controller 130 stores the list 700 in the second buffer 520 included in the memory 144 of the controller 130. The list 700 in which the entropies 706 are recorded by the respective memory blocks 552, 554, 562, 564, 572, 574, 582 and 584 may be stored in optional memory blocks of the memory device 150 by being included in metadata.

For example, in the list 700, E0 as the entropy 706 of the memory block 0 552 is recorded in correspondence to '0' as the index 702 of the memory block 0 552. E1 as the entropy 706 of the memory block 1 554 is recorded in correspondence to '1' as the index 702 of the memory block 1 554. E2 as the entropy 706 of the memory block 2 562 is recorded in correspondence to '2' as the index 702 of the memory block 2 562. E3 as the entropy 706 of the memory block 3 564 is recorded in correspondence to '3' as the index 702 of the memory block 3 564. E4 as the entropy 706 of the memory block 4 572 is recorded in correspondence to '4' as the index 702 of the memory block 4 572. E5 as the entropy 706 of the memory block 5 574 is recorded in correspondence to '5' as the index 702 of the memory block 5 574. E6 as the entropy 706 of the memory block 6 582 is recorded in correspondence to '6' as the index 702 of the memory block 6 582. E7 as the entropy 706 of the memory block 7 584 is recorded in correspondence to '7' as the index 702 of the memory block 7 584. The entropies 706 of the respective memory blocks 552, 554, 562, 564, 572, 574, 582 and 584 may be recorded in the list 700 by being set to N number of entropy levels depending on the numbers of the map segments of updated map data. For example, after setting 8 entropy levels including a level 0 to a level 7, corresponding entropy levels according to the numbers of the updated map segments by the respective memory blocks 552, 554, 562, 564, 572, 574, 582 and 584 may be recorded as the entropies 706 in the list 700. For example, 8 entropy levels includes the level 0 when the number of the map segments of updated map data is equal to or smaller than 32, a level 1 when the number of the map segments of updated map data is 33 to 128, a level 2 when the number of the map segments of updated map data is 129 to 512, . . . and the level 7 when the number of the map segments of updated map data is equal to or larger than 4000

The controller 130 combines the VPCs 704 and the entropies 706 by the respective memory blocks 552, 554, 562, 564, 572, 574, 582 and 584, recorded in the list 700, and generates parameters 708 for performing a background operation, for example, a garbage collection operation, for the memory blocks 552, 554, 562, 564, 572, 574, 582 and 584 of the memory device 150. Then, the controller 130 records the parameters 708 in the list 700 by the respective memory blocks 552, 554, 562, 564, 572, 574, 582 and 584. After generating the list 700 in which the parameters 708 are recorded by the respective memory blocks 552, 554, 562, 564, 572, 574, 582 and 584, the controller 130 stores the list 700 in the second buffer 520 included in the memory 144 of the controller 130. The list 700 in which the parameters 708 are recorded by the respective memory blocks 552, 554, 562, 564, 572, 574, 582 and 584 may be stored in optional memory blocks of the memory device 150 by being included in metadata.

For example, the controller 130 generates 'P0' as the parameter 708 of the memory block 0 552 by combining 'VPC0' as the VPC 704 of the memory block 0 552 and 'E0' as the entropy 706 of the memory block 0 552, and records 'P0' as the parameter 708 of the memory block 0 552 in correspondence to '0' as the index 702 of the memory block 0 552, in the list 700. The controller 130 generates 'P1' as the parameter 708 of the memory block 1 554 by combining 'VPC1' as the VPC 704 of the memory block 1 554 and 'E1' as the entropy 706 of the memory block 1 554, and records 'P1' as the parameter 708 of the memory block 1 554 in correspondence to '1' as the index 702 of the memory block 1 554, in the list 700. The controller 130 generates 'P2' as the parameter 708 of the memory block 2 562 by combining 'VPC2' as the VPC 704 of the memory block 2 562 and 'E2' as the entropy 706 of the memory block 2 562, and records 'P2' as the parameter 708 of the memory block 2 562 in correspondence to '2' as the index 702 of the memory block 2 562, in the list 700. The controller 130 generates 'P3' as the parameter 708 of the memory block 3 564 by combining 'VPC3' as the VPC 704 of the memory block 3 564 and 'E3' as the entropy 706 of the memory block 3 564, and records 'P3' as the parameter 708 of the memory block 3 564 in correspondence to '3' as the index 702 of the memory block 3 564, in the list 700. Also, the controller 130 generates 'P4' as the parameter 708 of the memory block 4 572 by combining 'VPC4' as the VPC 704 of the memory block 4 572 and 'E4' as the entropy 706 of the memory block 4 572, and records 'P4' as the parameter 708 of the memory block 4 572 in correspondence to '4' as the index 702 of the memory block 4 572, in the list 700. The controller 130 generates 'P5' as the parameter 708 of the memory block 5 574 by combining 'VPC5' as the VPC 704 of the memory block 5 574 and 'E5' as the entropy 706 of the memory block 5 574, and records 'P5' as the parameter 708 of the memory block 5 574 in correspondence to '5' as the index 702 of the memory block 5 574, in the list 700. The controller 130 generates 'P6' as the parameter 708 of the memory block 6 582 by combining 'VPC6' as the VPC 704 of the memory block 6 582 and 'E6' as the entropy 706 of the memory block 6 582, and records 'P6' as the parameter 708 of the memory block 6 582 in correspondence to '6' as the index 702 of the memory block 6 582, in the list 700. The controller 130 generates 'P7' as the parameter 708 of the memory block 7 584 by combining 'VPC7' as the VPC 704 of the memory block 7 584 and 'E7' as the entropy 706 of the memory block 7 584, and records 'P7' as the parameter 708 of the memory block 7 584 in correspondence to '7' as the index 702 of the memory block 7 584, in the list 700.

The controller 130 performs a background operation, for example, a garbage collection operation, for the memory blocks 552, 554, 562, 564, 572, 574, 582 and 584 of the memory device 150, by using the list 700 stored in the second buffer 520.

For example, the controller 130 performs a garbage collection operation for the memory blocks 552, 554, 562, 564, 572, 574, 582 and 584, by using the parameters 708 of the respective memory blocks 552, 554, 562, 564, 572, 574, 582 and 584, recorded in the list 700. That is, the controller 130 selects source memory blocks among the memory blocks 552, 554, 562, 564, 572, 574, 582 and 584, and copies and stores the valid data stored in the source memory blocks, into optional memory blocks included in the memory device 150. For example, the controller 130 copies and stores the valid data stored in the source memory blocks, into empty memory blocks, open memory blocks or free memory blocks as target memory blocks. The controller 130 performs an erase operation for the source memory blocks.

Particularly, the controller 130 predicts required times when performing the garbage collection operation, through the VPCs 704 by the respective memory blocks 552, 554, 562, 564, 572, 574, 582 and 584, recorded in the list 700. After selecting the respective memory blocks 552, 554, 562, 564, 572, 574, 582 and 584 as source memory blocks, the controller 130 predicts required times for copying and storing the valid data stored in the source memory blocks, into target memory blocks. Moreover, the controller 130 predicts required times when performing the garbage collection operation, through the entropies 706 by the respective memory blocks 552, 554, 562, 564, 572, 574, 582 and 584, recorded in the list 700. Furthermore, similar to the above descriptions, the controller 130 predicts required times when, after selecting the respective memory blocks 552, 554, 562, 564, 572, 574, 582 and 584 as source memory blocks and performing an operation of copying valid data to target memory blocks, performing a map update operation for the source memory blocks and the target memory blocks, that is, a map update operation for the memory blocks of the memory device 150.

That is, the controller 130 predicts required times when performing the garbage collection operation and the map update operation for the respective memory blocks 552, 554, 562, 564, 572, 574, 582 and 584, by using the parameters 708 of the respective memory blocks 552, 554, 562, 564, 572, 574, 582 and 584 generated by the VPCs 704 and the entropies 706 by the respective memory blocks 552, 554, 562, 564, 572, 574, 582 and 584. Then, the controller 130 selects source memory blocks among the respective memory blocks 552, 554, 562, 564, 572, 574, 582 and 584 by considering the predicted required times. For example, to minimize a time required to perform the garbage collection operation for the memory device 150, the controller 130 selects source memory blocks sequentially from a memory block having a minimal VPC, among the memory blocks 552, 554, 562, 564, 572, 574, 582 and 584 of the memory device 150. Then, the controller 130 copies and stores the valid data of the source memory blocks into target memory blocks. Further, to minimize a time required to perform the map update operation, the controller 130 selects source memory blocks sequentially from a memory block having a minimal entropy, among the memory blocks 552, 554, 562, 564, 572, 574, 582 and 584 of the memory device 150, and then, copies and stores the valid data of the source memory blocks into target memory blocks.

As a consequence, after predicting required times when performing a data copy operation, for example, a garbage collection operation in memory blocks, as a background operation for the memory blocks included in the memory device 150, by checking valid pages and entropies for the memory blocks included in the memory device 150, the garbage collection operation is performed by selecting source memory blocks from a memory block having a minimal required time. Accordingly, as the garbage collection operation for the memory device 150 is quickly and efficiently performed, utilization efficiency for the memory blocks included in the memory device 150 may be possibly maximized. Hereinbelow, an operation for processing data in a memory system in accordance with an embodiment will be described in detail with reference to FIG. 8.

Figure 8:
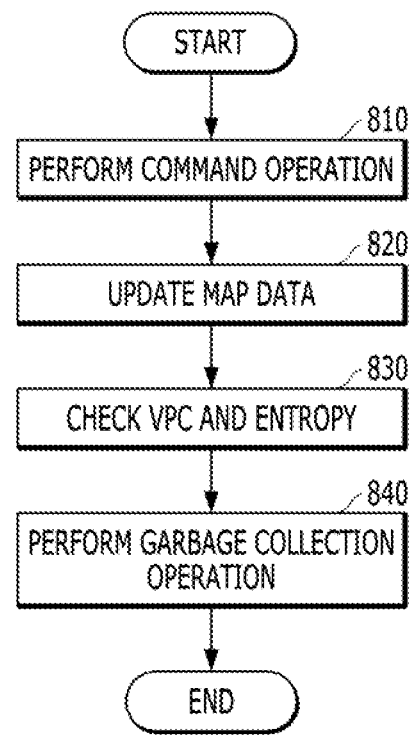
FIG. 8 is a flow chart illustrating an operation process for processing data in a memory system in accordance with an embodiment.

FIG. 8 is a flow chart illustrating an operation process for processing data in a memory system in accordance with an embodiment.

Referring to FIG. 8, at step 810, a memory system performs a command operation corresponding to a command received from the host 102. For example, the memory system performs a program operation corresponding to a write command received from the host 102. In particular, when receiving a write command for the data stored in the memory blocks of the memory device 150, from the host 102, the memory system programs and stores data corresponding to the write command, in other optional memory blocks among the memory blocks of the memory device 150, that is, performs an update program operation.

At step 820, in correspondence to the update program operation in the memory blocks of the memory device 150, map data for the memory blocks of the memory device 150 are updated.

Then, at step 830, VPCs and entropies by the memory blocks of the memory device 150 are checked. That is, the number of the valid pages of closed memory blocks and the number of the map segments of updated map data in the memory blocks included in the memory device 150 are checked.

At step 840, as a background operation for the memory blocks of the memory device 150, a data copy operation, for example, a garbage collection operation, in the memory blocks is performed. Namely, in consideration of the VPCs and the entropies of the memory blocks of the memory device 150, source memory blocks are selected among the memory blocks of the memory device 150. Then, after copying and storing the valid data of the source memory blocks into target memory blocks, an erase operation for the source memory blocks is performed. That is, the source memory blocks are generated as empty memory blocks, open memory blocks or free memory blocks.

Since detailed descriptions were made above with reference to FIGS. 5 to 7 for checking of VPCs and entropies for the memory blocks of the memory device 150, that is, checking of the numbers of valid pages and the numbers of the map segments of updated map data in the closed memory blocks of the memory device 150, performing of an operation of selecting source memory blocks among the memory blocks of the memory device 150 in consideration of the VPCs and the entropies checked in this way, and performing of a garbage collection operation for the memory blocks of the memory device 150, further descriptions thereof will be omitted herein. Hereinbelow, detailed descriptions will be made with reference to FIGS. 9 to 14, of electronic devices employing a memory system, according to various embodiments of the present invention.

Figure 9:
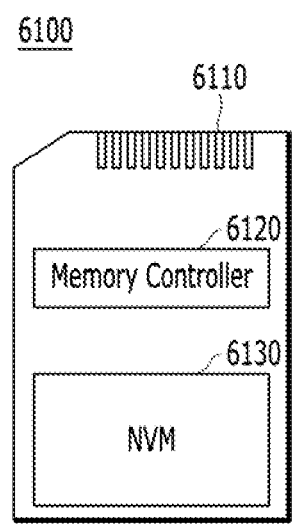
FIGS. 9 to 14 are diagrams illustrating memory systems, according to embodiments of the present invention.

FIG. 9 is a diagram illustrating a memory card system 6100 including the memory system in accordance with the embodiment of the present invention.

Referring to FIG. 9, the memory card system 6100 includes a memory controller 6120, a memory device 6130, and a connector 6110.

The memory controller 6120 is operatively connected with the memory device 6130. The memory controller 6120 may access the memory device 6130 for controlling the operations of the memory device 6130. For example, the memory controller 6120 may control the read, write, erase and background operations of the memory device 6130. The memory controller 6120 is also configured to provide an interface between the memory device 6130 and a host via the connector 6110. The memory controller may drive a firmware for controlling the memory device 6130.

The memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI-express (PCI-E), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), WIFI and Bluetooth. Accordingly, the memory system and the data processing system, according to an embodiment, may be applied to wired/wireless electronic appliances, in particular, a mobile electronic appliance.

The memory device 6130 may be a nonvolatile memory NVM. For example, the memory device 6130 may be one of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may form a solid state driver (SSD) by being integrated into a single semiconductor device. Also, the memory controller 6120 and the memory device 6130 may form a memory card such as a PC card (PCMCIA: Personal Computer Memory Card International Association), a compact flash card (CF), a smart media card (e.g., SM and SMC), a memory stick, a multimedia card (e.g., MMC, RS-MMC, MMCmicro and eMMC), an SD card (e.g., SD, miniSD, microSD and SDHC) and an universal flash storage (UFS).

Figure 10:
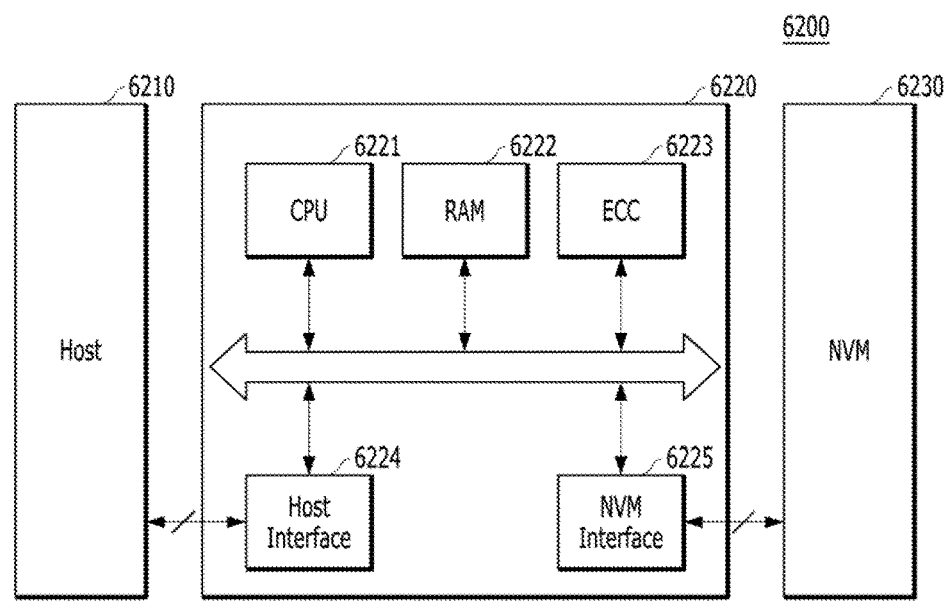

FIG. 10 is a diagram schematically illustrating an example of a data processing system 6200 including a memory system, according to an embodiment of the present invention.

Referring to FIG. 10, the data processing system 6200 may include a memory device 6230 which is implemented by at least one nonvolatile memory NVM and a memory controller 6220 which controls the memory device 6230. The data processing system 6200 shown in FIG. 10 may be a storage medium such as a memory card for example, a CF, a SD or a microSD, as described above with reference to FIG. 1. The memory device 6230 may correspond to the memory device 150 in the memory system 110 described above with reference to FIG. 1. The memory controller 6220 may correspond to the controller 130 in the memory system 110 described above with reference to FIG. 1.

The memory controller 6220 may control the operations for the memory device 6230 including read, write and erase operations in response to commands received from a host 6210. The memory controller 6220 may include at least one of a central processing unit (CPU) 6221, a buffer memory, for example, a random access memory (RAM) 6222, an error correction code (ECC) circuit 6223, a host interface 6224, and a memory interface, for example, an NVM interface 6225, all electrically coupled via an internal bus.

The CPU 6221 may perform the operations for the memory device 6230 such as read, write, file system management, bad page management, and so forth. The RAM 6222 may operate according to control of the CPU 6221, and may be used as a work memory, a buffer memory, a cache memory, or the like. When the RAM 6222 is used as a working memory, data processed by the CPU 6221 is temporarily stored in the RAM 6222. When the RAM 6222 is used as a buffer memory, the RAM 6222 is used to buffer data to be transmitted from the host 6210 to the memory device 6230 or from the memory device 6230 to the host 6210. When the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fall bit or an error bit in the data received from the memory device 6230. Also, the ECC circuit 6223 may perform error correction encoding for data provided to the memory device 6230, and may generate data added with parity bits. The parity bits may be stored in the memory device 6230. The ECC circuit 6223 may perform error correction decoding for data outputted from the memory device 6230. The ECC circuit 6223 may correct errors by using the parity bits. For example, as described above with reference to FIG. 1, the ECC circuit 6223 may correct errors by using various coded modulations such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 transmits and receives data to and from the host 6210 through the host interface 6224, and transmits and receives data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, when a wireless communication function or a mobile communication protocol such as wireless fidelity (WI-FI) or long term evolution (LTE) is implemented, the memory controller 6220 may transmit and receive data by being connected with an external device such as the host 6210 or another external device other than the host 6210. Specifically, when the memory controller 6220 is configured to communicate with an external device through at least one among various communication protocols, the memory system and the data processing system according to the embodiment may be applied to wired/wireless electronic appliances, in particular, a mobile electronic appliance.

Figure 11:
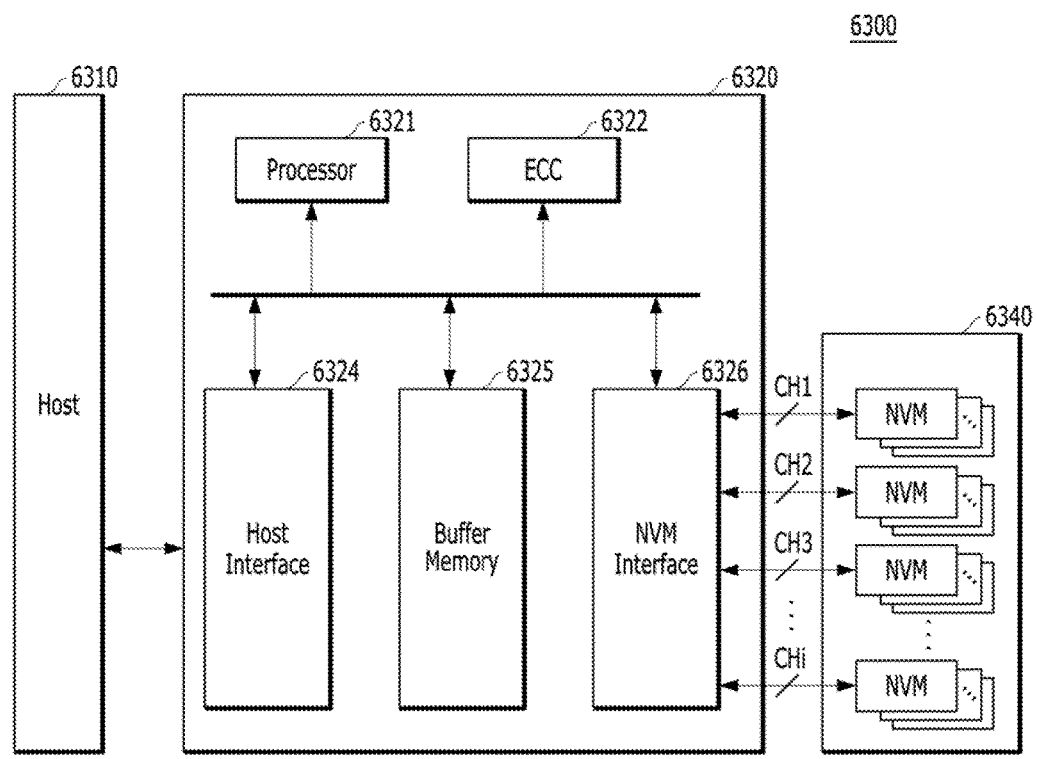

FIG. 11 is a diagram illustrating a solid state drive (SSD) 6300 employing a memory system, according to an embodiment of the present invention.

Referring to FIG. 11, the SSD 6300 may include a memory device 6340 which may include a plurality of nonvolatile memories NVM, and a controller 6320. The controller 6320 may correspond to the controller 130 in the memory system 110 described above with reference to FIG. 1. The memory device 6340 may correspond to the memory device 150 in the memory system 110 described above with reference to FIG. 1.

The controller 6320 may be connected with the memory device 6340 through a plurality of channels CH1, CH2, CH3, . . . , CHi. The controller 6320 may include at least one of a processor 6321, a buffer memory 6325, an error correction code (ECC) circuit 6322, a host interface 6324, and a memory interface such as a nonvolatile memory interface 6326.

The buffer memory 6325 may temporarily store data received from a host 6310 or data received from a plurality of nonvolatile memories NVM included in the memory device 6340, or temporarily store metadata of the plurality of nonvolatile memories NVM. For example, the metadata includes map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a ferroelectric random access memory (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 11, as an example, that the buffer memory 6325 is disposed inside the controller 6320, it is noted that the buffer memory 6325 may be disposed outside the controller 6320.

The ECC circuit 6322 calculates error correction code values of data to be programmed in the memory device 6340 in a program operation, performs an error correction operation for data read from the memory device 6340, based on the error correction code values in a read operation, and performs an error correction operation for data recovered from the memory device 6340 in a recovery operation for failed data.

The host interface 6324 provides an interface function with respect to an external device such as the host 6310. The nonvolatile memory interface 6326 provides an interface function with respect to the memory device 6340 which is connected through the plurality of channels CH1, CH2, CH3, . . . , CHi.

In an embodiment, a redundant array of independent disk (RAID) systems is provided in the system including a plurality of SSDs 6300. Each SSD 6300 may employ the memory system 110 described above with reference to FIG. 1. In a RAID system, the plurality of SSDs 6300 and a RAID controller for controlling the plurality of SSDs 6300 may be included. When performing a program operation by receiving a write command from the host 6310, the RAID controller may select at least one memory system that is, at least one SSD 6300 in response to the RAID level information of the write command received from the host 6310, among a plurality of RAID levels that is, the plurality of SSDs 6300, and may output data corresponding to the write command, to the selected SSD 6300. Also, when performing a read operation by receiving a read command from the host 6310, the RAID controller may select at least one memory system that is, at least one SSD 6300 in response to the RAID level information of the write command received from the host 6310, among the plurality of RAID levels that is, the plurality of SSDs 6300, and may provide data outputted from the selected SSD 6300, to the host 6310.

Figure 12:
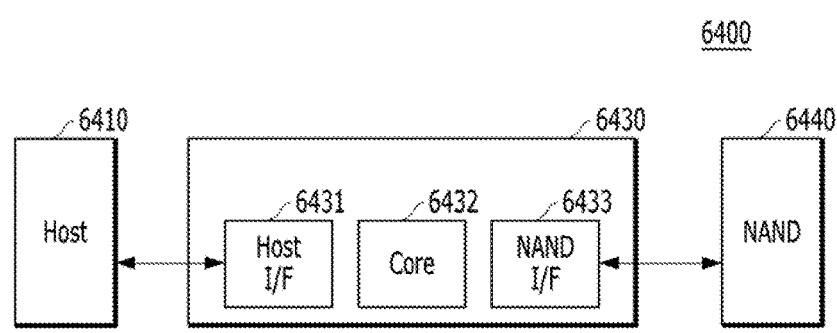

FIG. 12 is a diagram illustrating a data processing system 6400 including a memory system, according to an embodiment of the present invention. FIG. 12 schematically illustrates an embedded multimedia card (eMMC) to which a memory system is applied, according to an embodiment of the present invention.

Referring to FIG. 12, an eMMC 6400 may include a memory device 6440 which is implemented by at least one NAND flash memory, and a controller 6430. The controller 6430 may correspond to the controller 130 in the memory system 110 described above with reference to FIG. 1. The memory device 6440 may correspond to the memory device 150 in the memory system 110 described above with reference to FIG. 1.

The controller 6430 may be connected with the memory device 6440 through a plurality of channels indicated by the two headed arrow. The controller 6430 may include at least one core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or may be a serial interface such as an ultra-high speed (UHS)-I/UHS-II and a universal flash storage (UFS) interface.

Figure 13:
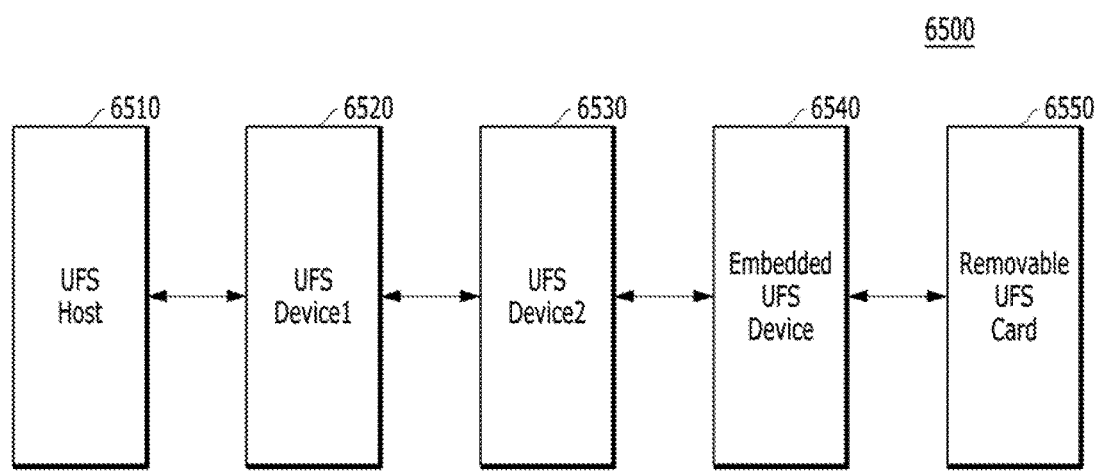

FIG. 13 is a diagram illustrating a universal flash storage (UFS) system 6500 having a memory system according to an embodiment of the invention.

Referring to FIG. 13, the UFS system 6500 may include a UFS host 6510, a plurality of UFS devices 6520 and 6530, an embedded UFS device 6540, and a removable UFS card 6550. The UFS host 6510 may be an application processor of a wired/wireless electronic appliance, in particular, a mobile electronic appliance.

The UFS host 6510, the UFS devices 6520 and 6530, the embedded UFS device 6540 and the removable UFS card 6550 may respectively communicate with external devices such as wired/wireless electronic appliances, in particular, a mobile electronic appliance, through a UFS protocol. The UFS devices 6520 and 6530, the embedded UFS device 6540 and the removable UFS card 6550 may be implemented with the memory system 110 described above with reference to FIG. 1, in particular, as the memory card system 6100 described above with reference to FIG. 9. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 14:
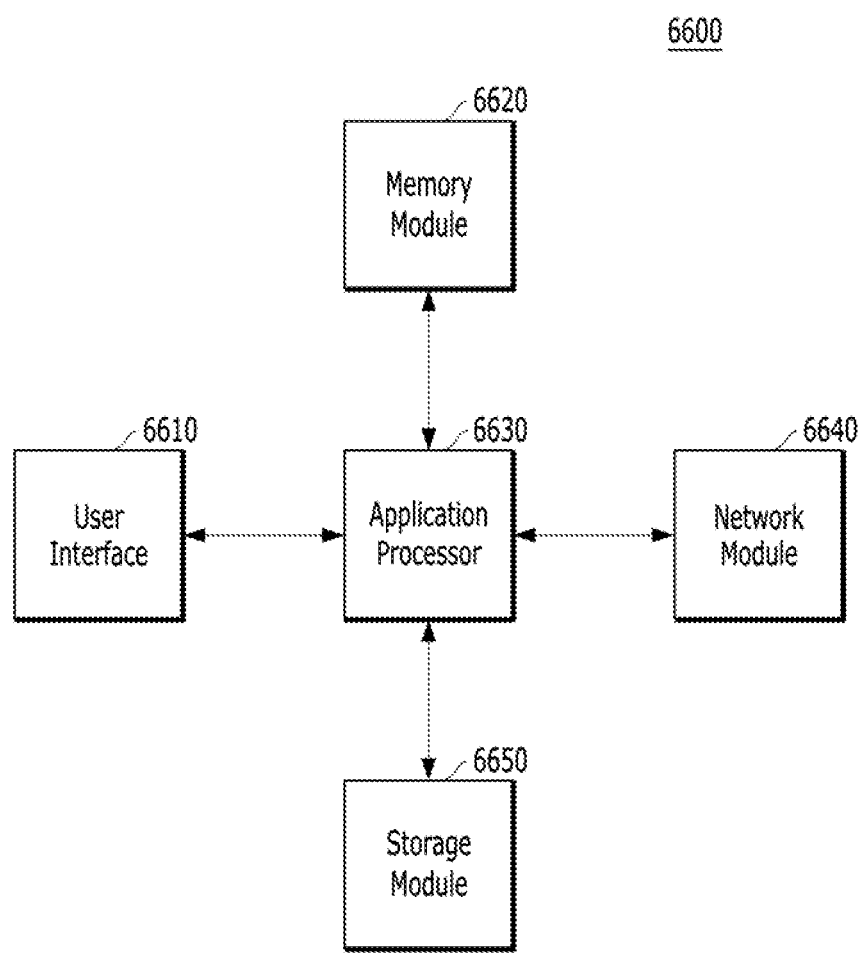

FIG. 14 is a diagram illustrating a user system 6600 having a memory system, according to an embodiment of the present invention.

Referring to FIG. 14, the user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided as a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged as a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and so on, and may thereby communicate with wired/wireless electronic appliances, in particular, a mobile electronic appliance. Accordingly, the memory system and the data processing system may be applied to wired/wireless electronic appliances. The network module 6640 may be included in the application processor 6630.

The storage module 6650 may store data such as data received from the application processor 6630, and transmit data stored therein, to the application processor 6630. The storage module 6650 may be implemented by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. Moreover, the storage module 6650 may be provided as a removable storage medium such as a memory card of the user system 6600 and an external drive. That is, the storage module 6650 may correspond to the memory system 110 described above with reference to FIG. 1, and may be implemented as the SSD, eMMC and UFS described above with reference to FIGS. 11 to 13.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

When the memory system 110 described above with reference to FIG. 1 is applied to the mobile electronic appliance of the user system 6600 according to an embodiment, the application processor 6630 may control the operations of the mobile electronic appliance, and the network module 6640 as a communication module controls wired/wireless communication with an external device, as described above. The user interface 6610 as the display/touch module of the mobile electronic appliance displays data processed by the application processor 6630 or supports input of data from a touch panel.

The memory system and the operating method thereof according to the embodiments may minimize complexity and performance deterioration of the memory system and maximize use efficiency of the memory device, thereby the memory system can quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
 a memory device including a plurality of memory blocks, each of the memory blocks including a plurality of pages; and
 a controller suitable for:
 storing user data corresponding to a write command, in the memory blocks;
 updating map data corresponding to the stored user data, in the memory blocks;
 determining entropies indicating amounts of the map data updated in the memory blocks which correspond to the stored user data; and
 selecting source memory blocks among the memory blocks, which correspond to the entropies.

2. The memory system according to claim 1, wherein the controller updates the map data corresponding to the stored user data, and determines the numbers of map segments of updated map data.

3. The memory system according to claim 2, wherein the entropies are determined in correspondence to the numbers of the map segments of the updated map data.

4. The memory system according to claim 3, wherein the controller selects the source memory blocks sequentially from a memory block having a minimal entropy among the memory blocks.

5. The memory system according to claim 4, wherein the controller performs, when a write command for the user data stored in the memory blocks is received from a host, an update program operation for the user data stored in the memory blocks.

6. The memory system according to claim 5, wherein the controller updates the map data for the memory blocks, corresponding to the update program operation in the memory blocks.

7. The memory system according to claim 2, wherein the controller determines valid pages in the memory blocks corresponding to the stored user data, and selects the source memory blocks corresponding to the numbers of the valid pages.

8. The memory system according to claim 7, wherein the controller selects the source memory blocks sequentially from a memory block having a minimal number of valid pages among the memory blocks.

9. The memory system according to claim 7, wherein the controller records parameters derived from combining the numbers of the valid pages and the entropies, the numbers of the valid pages and the entropies, in a list by the memory blocks, and stores the list in the memory blocks.

10. The memory system according to claim 1, wherein the controller selects target memory blocks among the memory blocks, and copies and stores valid data in the source memory blocks, into the target memory blocks.

11. A method for operating a memory system, comprising:
 storing user data corresponding to a write command, in a plurality of memory blocks in a memory device, each of the memory blocks including a plurality of pages;
 updating map data corresponding to the stored user data, in the memory blocks;
 determining entropies indicating amounts of the map data updated in the memory blocks corresponding to the stored user data; and selecting source memory blocks among the memory blocks, corresponding to the entropies.

12. The method according to claim 11, further comprising:

updating the map data corresponding to the stored user data, wherein the determining of the entropies comprises determining the numbers of map segments of updated map data.

13. The method according to claim 12, wherein the entropies correspond to the numbers of the map segments of the updated map data.

14. The method according to claim 13, wherein the selecting selects the source memory blocks sequentially from a memory block having a minimal entropy among the memory blocks.

15. The method according to claim 14, further comprising:

performing, when a write command for the user data stored in the memory blocks is received from a host, an update program operation for the user data stored in the memory blocks.

16. The method according to claim 15, wherein the updating of the map data comprises updating the map data for the memory blocks, which correspond to the update program operation in the memory blocks.

17. The method according to claim 12, wherein the determining of the entropies comprises determining valid pages in the memory blocks corresponding to the stored user data, and wherein the selecting selects the source memory blocks corresponding to the numbers of the valid pages.

18. The method according to claim 17, wherein the selecting of the source memory blocks comprises selecting the source memory blocks sequentially from a memory block having a minimal number of valid pages among the memory blocks.

19. The method according to claim 17, further comprising:

recording parameters derived from combining the numbers of the valid pages and the entropies in a list, by the memory blocks; and storing the list in the memory blocks.

20. The method according to claim 11, further comprising:

selecting target memory blocks among the memory blocks; and copying and storing valid data in the source memory blocks, into the target memory blocks.

* * * * *